United States Patent [19]
Albrecht et al.

[11] Patent Number: 5,654,881
[45] Date of Patent: Aug. 5, 1997

[54] EXTENDED RANGE DC-DC POWER CONVERTER CIRCUIT

[75] Inventors: Jonathan Joseph Albrecht, Endicott, N.Y.; Jason Andrew Young, Waltham, Mass.; William Anders Peterson, Vestal, N.Y.

[73] Assignee: Lockheed Martin Corporation, Bethesda, Md.

[21] Appl. No.: 609,691

[22] Filed: Mar. 1, 1996

[51] Int. Cl.$^6$ ............................................. H02M 3/337
[52] U.S. Cl. ........................... 363/25; 363/98; 363/134
[58] Field of Search .................................. 363/17, 22, 23, 363/24, 25, 26, 97, 98, 131–134

[56] References Cited

U.S. PATENT DOCUMENTS

| | | | |
|---|---|---|---|
| 3,898,549 | 8/1975 | Mitchell | 363/26 |
| 5,038,263 | 8/1991 | Marrero et al. | 363/20 |
| 5,077,652 | 12/1991 | Faley | 363/97 |
| 5,095,416 | 3/1992 | Ohms | 363/97 |
| 5,488,554 | 1/1996 | Green | 363/25 |

Primary Examiner—Peter S. Wong
Assistant Examiner—Adolf Berhane
Attorney, Agent, or Firm—Geoffrey H. Krauss

[57] ABSTRACT

A single-stage power converter has an input-to-output transfer characteristic with two portions, each having a different operational characteristic, with each portion being selected by changing ONLY the duty-cycle of the power switching devices. At low input voltage the converter operates as a Boost converter, while operating as a Buck converter for greater input voltages. This transfer characteristic is provided by a circuit wherein the primary winding center tap of a split-primary power transformer is coupled through an inductive element, with one of the pair of push-pull power switching devices connected to each primary winding end. Secondary winding rectification and filtering provides the power supply output in the Boost mode, and a portion of the power supply output in the Buck mode. The remainder of the Buck-mode output is supplied by the energy stored in the inductive element, preferably by use of a secondary winding on a transinductor (multiple-winding inductive) element having a primary winding providing the energy-storing inductance L.

16 Claims, 5 Drawing Sheets

EXTENDED RANGE DC-DC POWER CONVERTER CIRCUIT

The present invention relates to electrical power converters and, more particularly to a novel power converter which can operate with an input voltage varying over a wide range.

BACKGROUND OF THE INVENTION

Many avionics systems use at least one electronic power supply which is required to operate when energized with an input voltage varying over a very wide input voltage range. In these systems (typically found in an aircraft), the power supplies are energized from a Permanent Magnet Generator (PMG), which is typically mounted via gear box to the (aircraft) engine and outputs a voltage generally proportional to the speed of the engine. It is usually required to have the avionics equipment commence operation while the engine speeds and PMG output/power converter input voltages are very low, and continue to operate as the converter input voltage increases to some maximum, determined by the maximum engine speed. To operate over this large range of input voltage, it has often been necessary to cascaded plural power converter stages, so as to successively reduce the input voltage ranges in stages, down to manageable levels, with the last converter stage then providing the necessary filtering, isolation, scaling and regulation for the avionics system. If active power factor correction is also required, an additional pre-regulator converter is cascaded with the cascade of power conversion stages. As is well known, multiple power conversion stages reduce efficiency, increase cost, and increase size of the power supply system.

It is therefore highly desirable to provide a power supply converter having a single stage, which will achieve a required DC output voltage with some degree of regulation for a very large input voltage range. It is also desirable to provide a single stage power converter which has a good input-to-output isolation, while attaining a high efficiency (typically, greater than 80%). For power factor correction applications, this push-pull converter, by transitioning between the Boost and Buck operating modes, is able to shape the input current.

BRIEF DESCRIPTION OF THE INVENTION

In accordance with the invention, a single-stage power converter of the push-pull type has two separate input to output transfer characteristics (typically, both Buck and Boost regulator characteristics) selectable by changing ONLY the duty-cycle of the power switching devices. At low input voltage (i.e. below a transition voltage determined by the desired output voltage) the push-pull converter operates as a Boost converter, while operating as a Buck converter for input voltages higher than the transition voltage. This transfer characteristic is advantageously provided by a circuit topology wherein the primary winding center tap of a split-primary power transformer is coupled through an inductive element, with one of the pair of push-pull power switching devices connected to each primary winding end. Secondary winding rectification and filtering provides the power supply output in the Boost mode, and a portion of the power supply output in the Buck mode. The remainder of the Buck-mode output is supplied by the energy stored in the inductive element, preferably by use of a secondary winding on a transinductor element having a primary winding providing the energy-storing inductance L.

In one presently preferred embodiment, a pair of opposed-polarity outputs are generated by a single-stage converter having a single transformer and corresponding single pair of pulse-width-modulated switching devices, with a common inductive element having a pair of secondary windings coupled thereto and connected to corresponding oppositely-poled outputs through an associated one of oppositely-poled unidirectionally-conductive devices.

Accordingly, it is one object of the present invention to provide a novel power converter of the Boost/Buck push-pull type, capable of operating over a wide range of input voltages.

This and other objects of the present invention will become apparent upon perusal of the following detailed description of several presently preferred embodiments, when considered in conjunction with the appended drawings.

DETAILED DESCRIPTION OF THE PRESENTLY PREFERRED EMBODIMENTS

Figure 1:
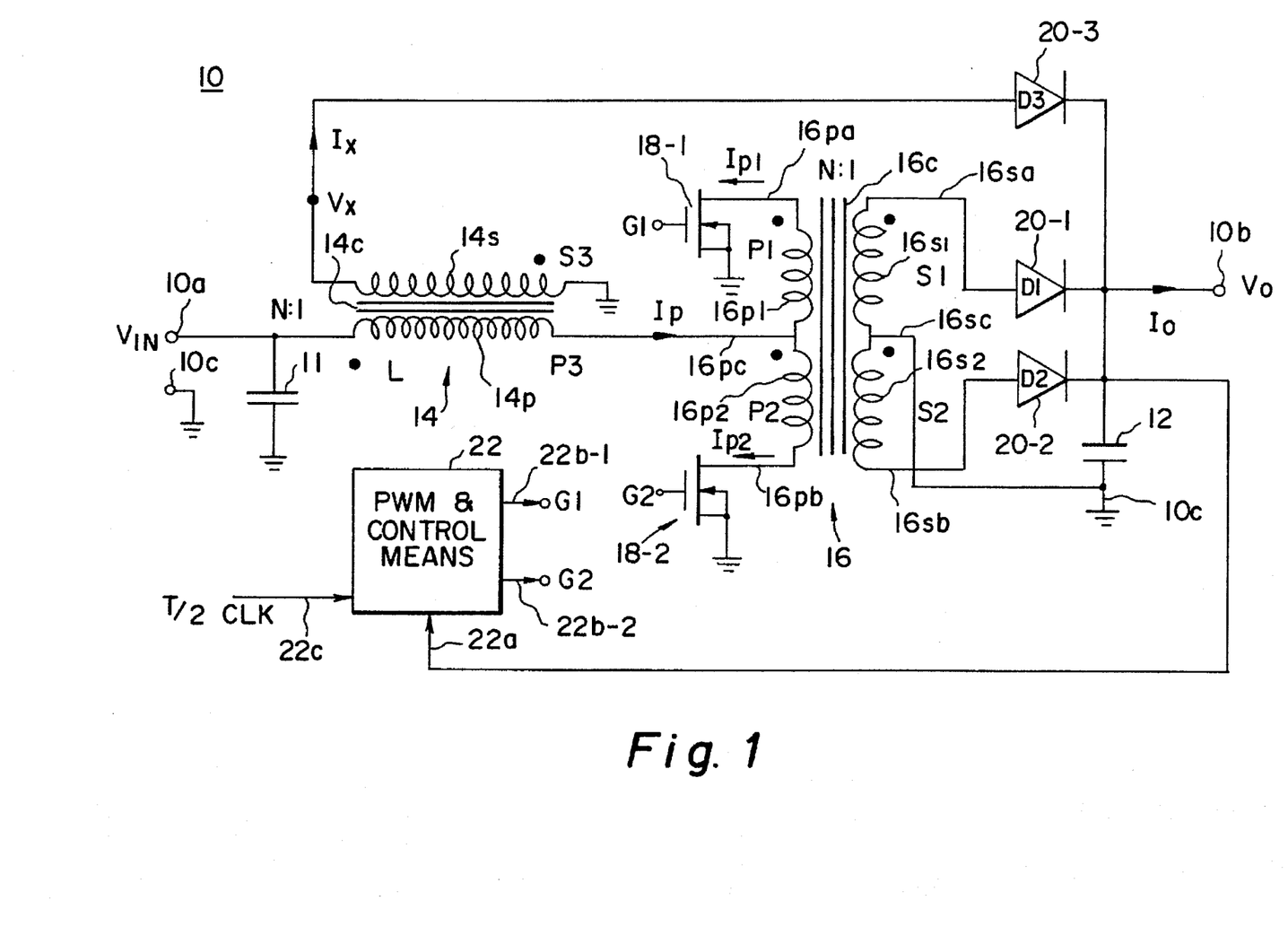
FIG. 1 is a schematic diagram of a single-output single-stage Buck/Boost push-pull power converter in accordance with the principles of the present invention.

Referring initially to FIG. 1, a power converter 10 for a power supply for avionics and the like, has an input terminal 10a at which electrical power, at a DC input voltage $V_{IN}$ is received, and an output terminal 10b, at which a DC output voltage $V_o$ is provided at some output current $I_o$; both voltages are designated with respect to a common potential at a common terminal 10c. The input voltage may appear across an input capacitance element 11, while the output voltage appears across a filter capacitance 12.

A Boost-Buck inductor 14, herein denominated as a transinductor (an inductor formed by a primary winding 14p, with an unconnected secondary winding 14s transformer coupled thereto), has an inductance L across the plurality P3 of turns of primary winding 14p, formed upon a magnetic core 14c. The secondary winding 14s of S3 turns is also wound on core 14c, and is preferably not directly connected to the primary winding 14p; the primary-to-secondary turns ration P3:S3 is selected to be N:1. A current $I_p$ flowing into the end of winding 14p connected to input 10a causes a negative voltage $V_x$ to be developed at the end of winding 14s not connected to common potential.

A converter transformer 16 has a split primary 16p, comprised of a first portion 16p1 and a second portion 16p2. The first portion 16p1 has P1 turns wound upon a transformer core 16c, with a first winding end 16pa connected to the controlled current circuit (e.g. the drain-source circuit) of a first active switching device 18-1 (such as a power MOSFET and the like, having a current $I_{p1}$ flowing therethrough responsive to a control signal G1 at a control, gate, element thereof. The other end of primary winding first portion 16p1 is connected to a common center tap 16pc. The second portion 16p2 has P2 turns wound upon the same transformer core 16c, with a first winding end 16pb connected to the controlled (drain-source) current circuit of a second active switching device 18-2, having a current $I_{p2}$ flowing therethrough responsive to a control signal G2 at a control, gate, element thereof. The other end of primary winding second portion 16p2 is connected to common center tap 16pc. The windings have equal turns (P1=P2) and are phased, as indicated by the illustrated phasing dots, such that equal and opposite (i.e. canceling) core fluxes are generated for equal currents $I_{p1}$ and $I_{p2}$ flowing toward active switching devices 18-1 and 18-2, respectively. The transformer has a pair of secondary windings 16s1 and 16s2, having essentially equal turns S1 and S2 coupled to core 16c, so that a first secondary voltage Vs1 of a first polarity appears at a first secondary winding first end 16sa, with respect to a first secondary winding second end connected to a secondary winding center tap 16sc (typically connected to common potential at terminal 10c), while a second voltage Vs2 of a second polarity, opposite to the first polarity, appears at a second secondary winding first end 16sb, with respect to the second end of that winding, which is connected to the secondary center tap 16sc.

Each secondary winding portion 16s1 and 16s2 has substantially the same turns S1 or S2, selected to have a 1:N ratio to the substantially similar turns P1 or P2 of the associated primary windings; this is the same ratio N as selected for the transinductor 14. Each secondary winding first end 16sa and 16sb is connected to a anode electrode of an associated one of a pair of like-poled unidirectionally-conducting elements 20-1 and 20-2, such as semiconductor diodes, having their cathodes connected in common to output capacitor 12 and the convertor output 10b. Another unidirectionally-conductive element 20-3 receives the transinductor secondary winding voltage $V_x$ at its anode and has its cathode connected to the cathodes of the other diodes 20-1 and 20-2.

A pulse-width modulator and control means 22 has an input 22a monitoring the magnitude of the output voltage $V_o$, and another input 22c receiving a periodic clock CLK signal. The clock signal establishes the operating frequency of the push-pull, Boost/Buck converter formed by magnetic components 14 and 16 and semiconductors 18 and 20; an operating frequency in excess of 1 KHz is generally desirable. Means 22 has respective first and second outputs 22b-1 and 22b-2 at which the first and second switching device gating, or control, signals G1 and G2 respectively are provided to turn respective devices 18-1 and 18-2 individually into the conductive, or ON, condition or into the non-conductive, or OFF, condition. It should be understood that each illustrated device 18 may be a single power switching device, of semiconductive or other form, or may be plural devices (as necessary to properly switch the required current and/or voltage) controlled in unitary fashion.

In operation, means 22 input 22a monitors the voltage at output 10b and, by any of various well-known means, compares the actual output voltage $V_o$ to the selected output value; means 22 then controls the converter duty cycle, responsive to this determination, to regulate and maintain $V_o$ at the selected value. Means 22 thus determines, at start-up, if the output voltage is greater than, or less than, the desired value; this can also be thought of as determining if the input voltage $V_{IN}$ is greater, or less, than $N*V_o$. In the case where the output voltage $V_o$ is less than the selected value, means 22 adjusts the outputs 22b to control operation of converter 10 in the Buck mode; the converter is operated in the Boost mode when the input voltage $V_o$ is less than the selected value. BUCK MODE: If the duty-cycle is less than 50% (i.e. the ratio of switch ON conduction time to the total of ON and switch OFF, or non-conduction, times in one ON/OFF cycle), then the Buck mode is being used. Push-pull Buck mode utilizes two segments, of a four segment operating cycle (of duration T), during which both switches 18-1 and 18-2 are non-conductive, or OFF; one switch 18-1 is conductive, or ON, during a time segment different from the time segment during which the other switch 18-2 is ON.

Figure 2:
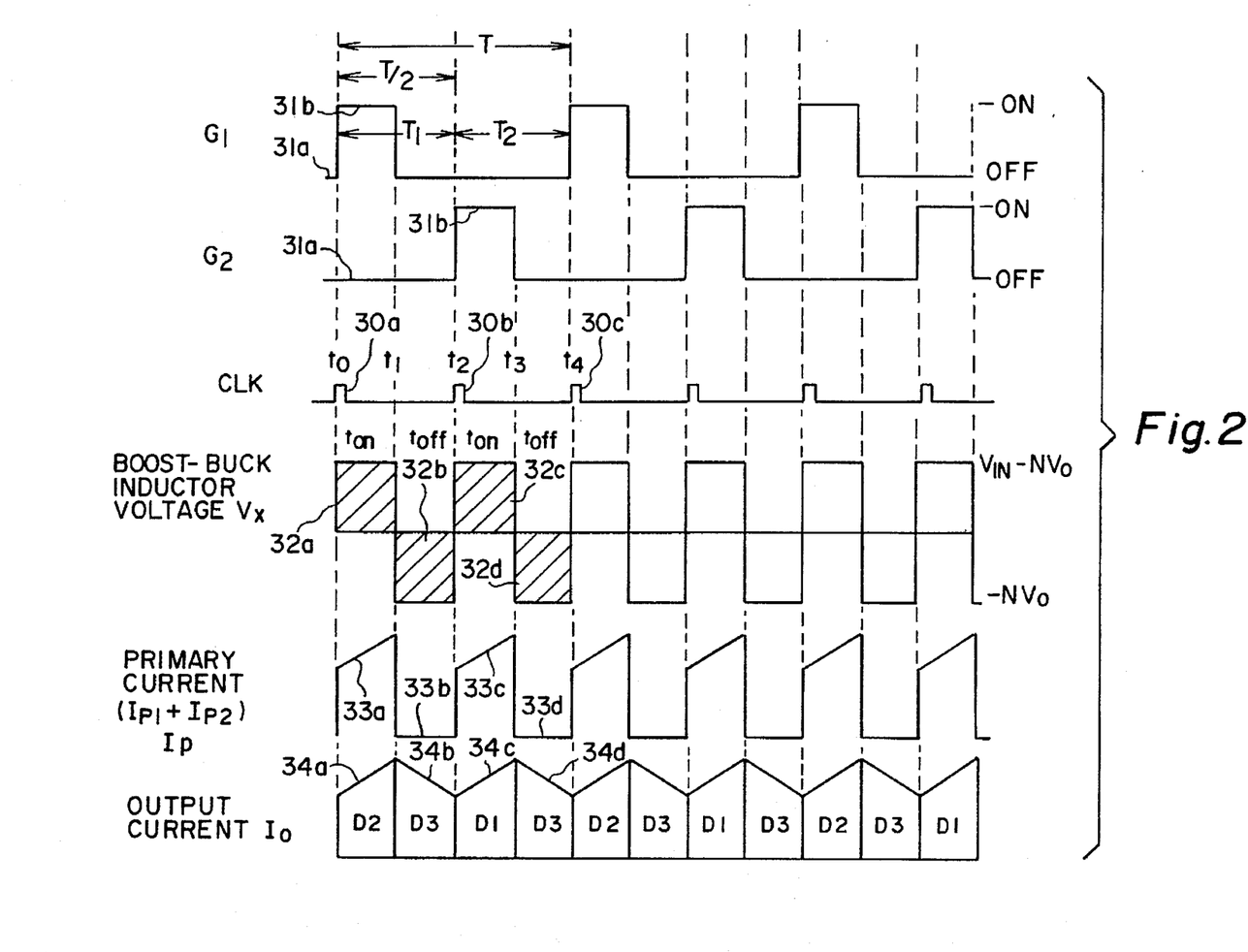
FIGS. 2 and 3 are coordinated voltage and current waveforms occurring at several locations in the power converter during the respective Buck mode and Boost mode of operation.

As shown in FIG. 2, at time $t_0$ (which may be set by a first clock pulse 30a) the first control signal G1 changes from an OFF level 31a to a level 31b selected to cause switching device 18-1 Q1 to turn ON; second control signal G2 is already at the level 31a causing switching device 18-2 to be turned OFF. When device 18-1 conducts and device 18-2 is OFF, current $I_{p1}$ is the primary current flowing through series-connected transformer winding 16p1 and transinductor winding 14p. A voltage $V_{IN}-NV_o$ appears across the primary winding 14p, in region 32a, and Boost-Buck inductor 14 stores energy; the primary current $I_{p1}$ begins to increase, so that a current ramp 33a flows through winding 14p. The transformer first section current flow $I_{p1}$, via transformer action, causes a secondary current of magnitude $N*I_{p1}$ to flow in secondary winding 16s2, and with a now-forward-biased diode 20-2, allows this increasing-ramp secondary current portion 34a to flow as current $I_o$ out of output 10b and to a load (not shown).

At a later time $t_1$, means 22 changes the G1 signal to level 31a, to cause device 18-1 to turn OFF, so that current $I_{p1}$ falls to zero (region 33b) and diode 20-2 stops conducting; device 18-2 is still OFF. Now, the energy stored in Boost-Buck inductor 14 during the first device ON time interval ($t_1-t_0$) discharges, in region 32b, as a current $I_x$ flowing through secondary winding 14s and diode 20-3, to terminal 10b, this is an output current $I_o$ portion which decreases as ramp portion 34b. The magnitude of the current is $N*I_{p1}$.

At a still later time $t_2$, when the first half T1 of an operating cycle is complete (as may be determined by arrival of a next T/2 CLK pulse 30b), signal G2 is raised to level 31b to cause the other device 18-2 to switch ON, while signal G1 remains low so that device 18-1 remains OFF. Now, primary current $I_p$ is second portion current $I_{p2}$, which flows through connected windings 14p and $16_{p2}$, in region 33c. The current through winding 16p2 causes a secondary winding current to flow in winding 16s1 via transformer action. This secondary current 34c flows through now-conducting diode 20-1 to terminal 10b and the load. Current $I_{p2}$ begins to ramp up through the Boost-Buck inductor winding 14p, as at portion 33c, and energy is again stored in the transinductor (region 32c). A secondary current of magnitude $N*I_{p1}$ now flows in secondary winding 16s1, and with a now-forward-biased diode 20-1, allows this increasing-ramp secondary current portion 34d to flow as current $I_o$.

At an even later time $t_3$, device 18-2 is turned OFF by signal G2 falling to level 31a, and current $I_{p2}$ falls to zero (region 33d); diode 20-1 stops conducting. The region 32c energy stored in Boost-Buck inductor 14 while device 18-2 was conducting is now discharged in region 32d as a current portion 34d flowing through the secondary winding 14s and out to the load through diode 20-3. The magnitude of this current is $N*I_{p2}$. The second time interval half T2 ends at time $t_4$, when another clock pulse 30c may be presented, and interval T2 is of ($t_4-t_2$) duration; it is desirable that the latter T2 interval be equal to the former T1 interval, i.e. T1=T2=T/2, so that control at a clock frequency $F_c=2/T$ which is twice the operational frequency F=1/T, is desirable.

The operational cycle is continuously repeated, e.g. a second cycle commences at time $t_4$, at the substantially constant frequency ($1/T$). The turn-on times of devices 18-1 and 18-2 ($t_0$ and $t_2$, respectively) are most desirably maintained as always a constant half-period T/2 apart. It will be seen that converter 10 acts in the Buck mode by storing excess input energy in the inductance L of transinductor 14 during the switching device ON time intervals and then transferring this stored energy to output 10b during the switching device OFF time intervals. During operation in this Buck mode, converter 10 exhibits discontinuous input current but continuous output current $I_o$. Operation may be further analyzed by noting that the integral of the Boost-Buck transinductor primary winding voltage over one time period (T) must be zero. Therefore, from FIG. 2:

(a) the ON time interval energy is $2 * t_{on} * (V_{IN} - N * V_o)$, where $t_{on}$ is the time interval ($t_1 - t_0$), for device 18-1, or the time interval ($t_3 - t_2$), for device 18-2; and (b) the OFF time interval energy is $2N * V_o * t_{off}$, where $t_{off}$ is the time interval ($t_2 - t_1$), for device 18-1, or the time interval ($t_4 - t_3$), for device 18-2; so that (c) for equal ON interval energy and OFF interval energy:

$$2 * t_{on} * (V_{IN} - N * V_o) = 2N * V_o * t_{off}. \quad (1)$$

The OFF time interval $t_{off}$ is expressible in terms of the time period T and $t_{on}$ as $$t_{off} = (T/2) - t_{on}, \quad (2)$$

Using equations (1) and (2), the input-to-output transfer characteristic for Buck mode operation is:

$$V_o = (2\alpha/N) * V_{IN} \quad (3)$$

where the duty cycle a of either one of the switching devices 18 is given by the ratio of ($t_{on}/T$). Thus, when the output voltage monitored at means input 22d exceeds the desired value, the excessive value is utilized by means 22 to control the duty cycle a, by use of well-known techniques, to yield and maintain (regulate) the output voltage at the selected output voltage $V_o$ value.

BOOST MODE: If the duty-cycle required is greater than 50%, then Boost mode is being used (and devices 18-1 and 18-2 will both be ON at the same time for portions of the switching period T). The switching period T and the delay time (T/2) are kept constant for both the Boost and Buck modes. Push-pull Boost mode utilizes both devices in the ON condition in three of four operational segments; there will be only one different one, for each device, of the four segment operating cycle (of duration T), during which that one of switches 18-1 and 18-2 is non-conductive, or OFF. Thus, one switch 18-1 is non-conductive, or OFF, during a time segment different from the time segment during which the other switch 18-2 is OFF.

Figure 3:
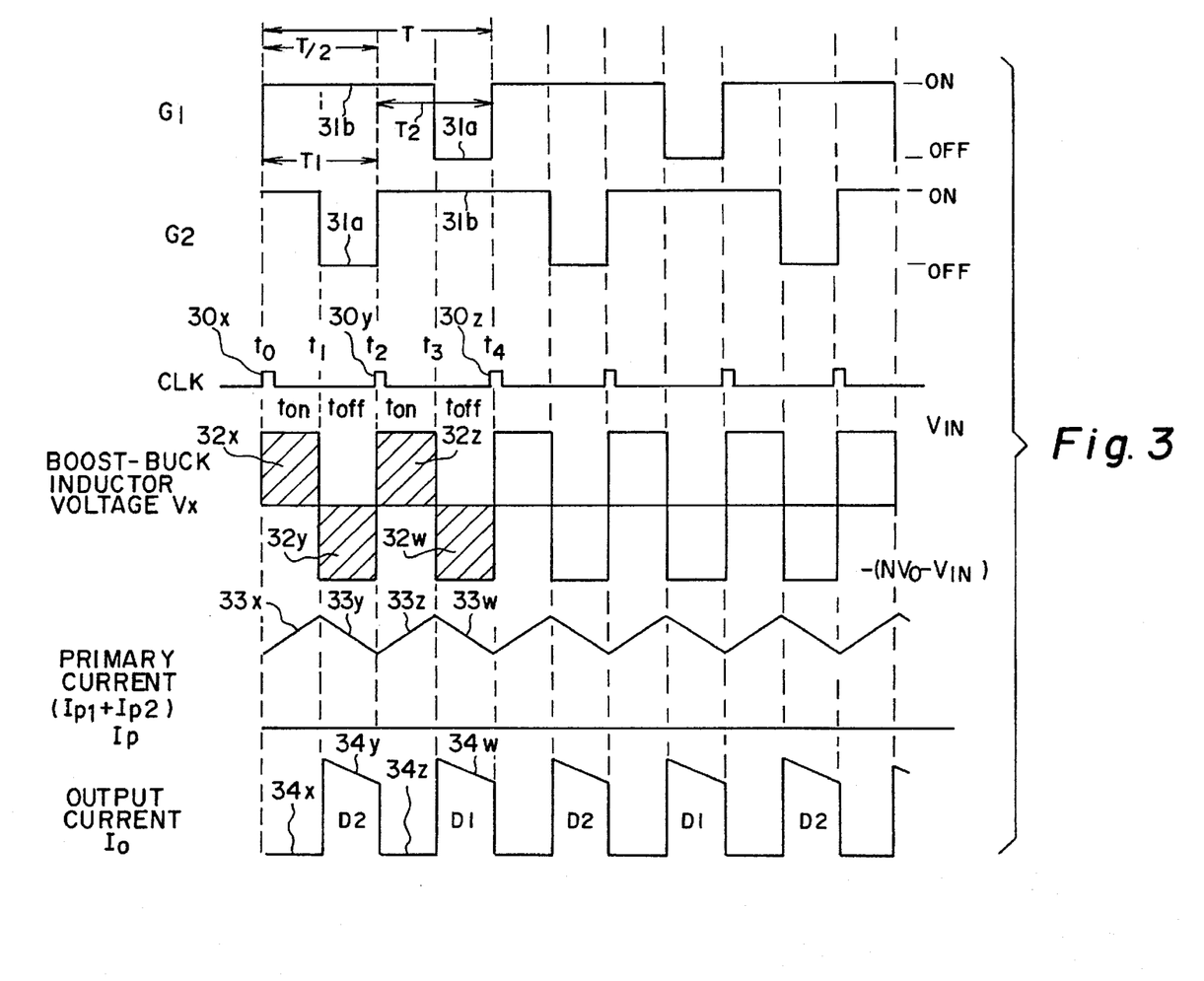
Figure 4:
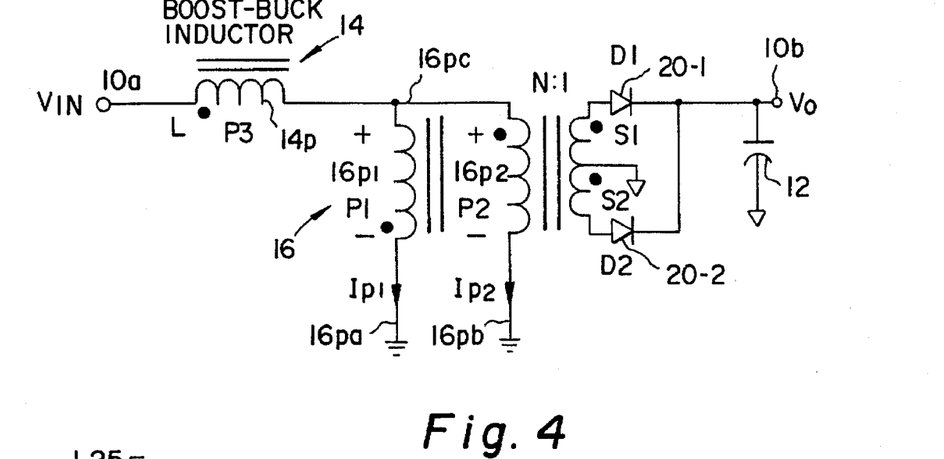
FIG. 4 is an equivalent circuit of a portion of the power converter during part of the Boost mode of operation, and useful in understanding operation therein.

As shown in FIG. 3, at time $t_0$ (which may be set by a first clock pulse 30x) the first control signal G1 changes from its OFF level 31a to the 31b level causing switching device 18-1 to turn ON; second control signal G2 is already at the 31b level, as switching device 18-2 was previously turned ON. From time $t_0$ to time $t_1$, when device 18-2 is turned OFF, current $I_{p1}$ flows through transformer first primary winding portion 16p1 and current $I_{p2}$ flows through transformer second primary winding portion 16p2. During this time interval the equivalent circuit is as shown in FIG. 4:

current $I_{p2}$ flows into the "dotted" side of the 16p2 winding; current $I_{p1}$ flows out of the "dotted" side of the 16p1 winding; and equal but opposite fluxes are developed thereby in transformer core 16c. These fluxes cancel and form an effective short circuit across the transformer primaries 16p1 and 16p2. With this short circuit across the transformer, a voltage $V_x$ equal to $V_{IN}$ is placed across the Boost-Buck transinductor winding 14p. This voltage causes the current 33x to ramp up in the inductance L of the transinductor and the inductance begins to store energy, as seen in region 32x.

At a latter time $t_1$, device 18-2 turns OFF while device 18-1 remains ON. With device 18-2 OFF, its drain current $I_{p2}$ stops flowing through winding 16p2 and the flux cancellation across the transformer primaries ceases. Region 32y is entered and energy is now transferred to the secondary via transformer action. The magnitude of this energy is equal to the input voltage ($V_{IN}$) plus the energy stored in the inductance L of transinductor 14. During this portion of the switch period, from time $t_1$ to time $t_2$, the polarity of the voltage $V_x$ across winding 14s reverses at a magnitude of $NV_O - V_{IN}$ and primary current $I_p$ begins to ramp down, in region 33y. Diode 20-2 is forward biased and provides output current $I_o$ flow from secondary winding 16s2 to the output 10b and its associated load.

At a still later time $t_2$, signal G2 returns to the higher level 31a and turns device 18-2 back ON, while signal G1 continues to control associated device 18-1 in the ON state. Again, equal but opposite fluxes are developed in both primary windings 16p1 and 16p2, to form a short to ground/common potential. The Boost-Buck inductance L stores input energy, in region 32z, and energy is not transferred to output 10b, as shown in region 34z.

At a yet later time $t_3$, device 18-1 is turned OFF as signal G1 falls to the lower level 31a, while signal G2 remains at high level 31b and device 18-2 remains ON. With device 18-1 turned OFF, current $I_{p1}$ stops flowing through winding 16p1 and the flux cancellation across the transformer primaries again ceases. Energy is now transferred through secondary winding 16s1 and diode 20-1, to the output (region 34w). Again, the magnitude of this energy is equal to the input voltage ($V_{IN}$) plus the energy stored in the Boost-Buck transinductor. During the ($t_4 - t_3$) portion of the switching period T, the voltage polarity on winding 14p reverses and current begins to ramp down (region 33w). This completes the switching period.

This cycle is repeated at time $t_4$ at a constant frequency (1/T). The turn-on times ($t_0$ and $t_2$, respectively) of signals G1 and G2, and therefor of devices 18-1 and 18-2, are preferably always a constant half-period (T/2) apart, just as in the Buck mode of operation; this may be advantageously provided by introduction of a stable clock CLK signal to means input 22c.

It will be seen that the Push-Pull converter 10 acts in this mode of operation as a Boost converter by storing excess input energy in inductance L during the switch ON times ($t_{on}$) and transferring this stored energy, plus input voltage $V_{IN}$, to the output 10b during the switch OFF times ($t_{off}$). As does any Boost converter, the converter, while operating in this mode, exhibits continuous input current (see waveform 33) and discontinuous output current (see waveform 34). It should be noted that transinductor secondary winding 14s and diode 20-3 do not supply current to the load during Boost operation.

Since the integral of the Boost-Buck transinductor primary voltage over one time period (T) must be zero, the equation for the inductor voltage is:

$$2*V_{IN}*t_{on}=2*t_{off}*(N*V_o-V_{IN}). \quad (4)$$

Referring again to equation (2), and now defining the duty-cycle α of each switch as $$\alpha=(2*t_{on}+t_{off})/T, \quad (5)$$

we use equations (4), (5) and (2) to obtain the input-to-output transfer characteristic for Boost mode operation as:

$$V_o=V_{IN}/(2(1-\alpha)*N). \quad (6)$$

Now, means 22 again operates upon the outputs 22b to control the duty cycle α to regulate the output voltage at the selected $V_o$ value.

From FIG. 2, it will be seen that the peak voltage across each of the switching devices in Buck mode occurs when both devices are OFF and the D3 Boost-Buck diode 20-3 is conducting. At this point, the drain-to-source voltage, $V_{ds}$, is $V_{IN}+NV_o$. Further, from FIG. 3, it will be seen that the peak voltage across each of the switching devices in Boost mode occurs when one switch is OFF and the other is ON. In this condition, $V_{ds}$, is just $NV_o$. In either case, this is less than the $2V_{IN}$ voltage normally seen across the switching devices in a classical push-pull converter. This may allow the designer to select potentially more economical devices 18 with lower ratings.

Figure 5:
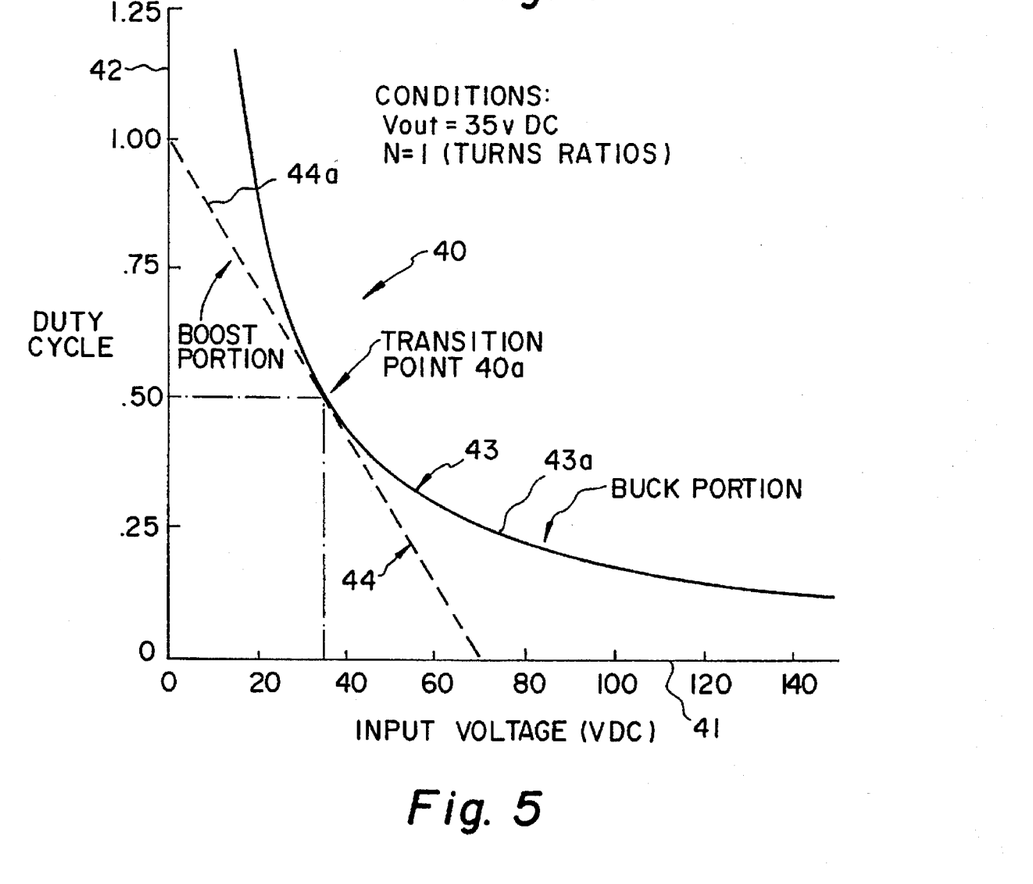
FIG. 5 is a graph illustrating the unified operation curve of the converter.

Referring now to FIG. 5, in accordance with a basic principle of the invention, one novel aspect of this converter is that the converter transfer curve 40 partakes of the transfer characteristics of two different power converter topologies, Boost and Buck, which are selectable by changing ONLY the duty cycle α of the two power switches 18-1 and 18-22. Using both the Boost and Buck modes, operation over very large input voltage swings (plotted along X-axis 41) are achievable. Transitioning between the two modes (the Buck mode represented by solid curve 43, of which only lower portion 43a is used, and the Boost mode represented by broken curve 44, of which only upper portion 44a is used) is smooth and unnoticeable to subsequent load (e.g. downstream circuitry). For various duty-cycles α, plotted along Y-axis 42, the curve 40 obtained by the aforementioned selection of the appropriate portions of both transfer equations (equations 3 and 6) converges at the 50% duty cycle point 40a. Curve 40 (shown as dimensioned for a particular design example) show the smooth transfer from one mode to the other which can be effected. During this transition, there is no ripple in the transinductor current, as there is no voltage across inductance L; the input voltage $V_{IN}$ is then exactly equal to $NV_o$. Although this condition is desirable, difficulty arises when using peak current mode control to control the converter, since there is no slope. This easy transition characteristic also lends itself to power factor correction applications where the converter must transition between the Boost and Buck modes, at the frequency of the input voltage source, to force the input current to follow the input voltage. Note also that there is input-output isolation, through the magnetic elements 14 and 16.

A 150 Watt converter was built to provide an output voltage regulated at 25 VDC, for an input voltage varying from 15 VDC to 200 VDC. We selected N=2, so that a 2:1 turns ratio was used for both magnetic components 14 and 16. A switching frequency of 500 KHz (T=2 microseconds) for each switch was selected to reduce the size of the magnetic components; this is commensurate with a clock frequency of 1 MHz. The converter 10 exhibits an efficiency of 85%, yet is a functional replacement for an existing power supply that uses twice the board area and costs 30% more.

Figure 6:
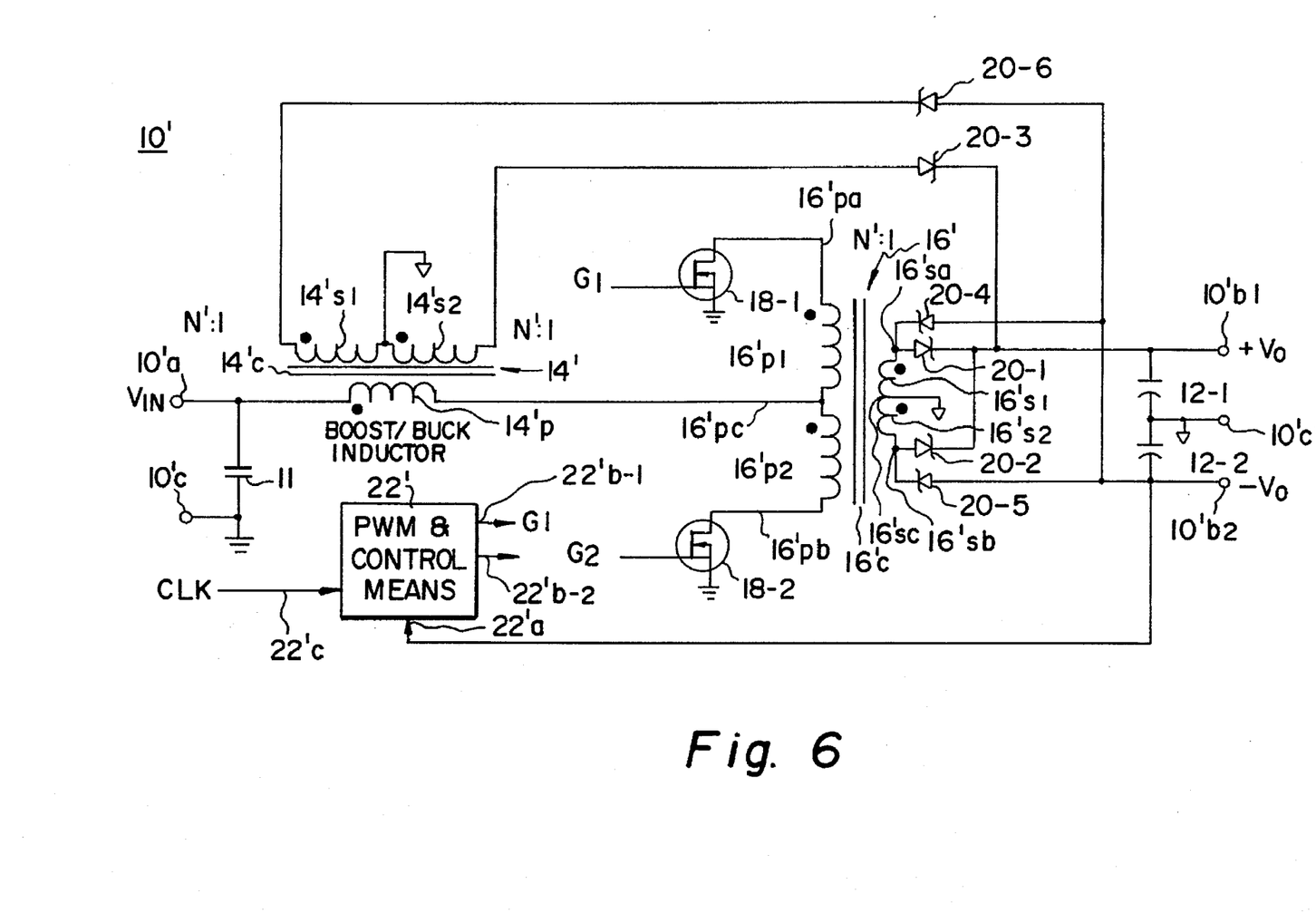
FIG. 6 is a schematic diagram of a multiple-output single-stage Buck/Boost push-pull power converter in accordance with the principles of the present invention.

Referring now to FIG. 6, a second embodiment 10' of our novel power supply provides both a positive-polarity $+V_o$ output voltage at a first terminal 10'b1 and a separate negative-polarity $-V_o$ voltage (of opposite polarity but substantially similar amplitude) at another output terminal 10'b2. The additional output is provided by adding (1) a second pair of output rectifiers, respectively diode 20-4 or 20-5, between the added output 10b'2 and the respective secondary winding end 16'sa or 16'sb, of opposite poling to the first-polarity diodes 20-1 and 20-2 connected between output 10'b1 and the same secondary winding ends; (2) a second winding 14's2 on the transinductor 14', of oppositephase to the first winding 14's1; and (3) an additional diode 20-6. Conduction intervals of diodes 20-4 and 20-5 and diode 20-6 is analogous to the intervals for diodes 20-1 or 20-2 and for diode 20-3. Either polarity of the output voltages may be monitored for regulation purposes, as indicated by the connection of the negative polarity output to control means input 22'd. Other configurations (e.g. a single secondary transinductor winding and a diode bridge) may be usable for a particular purpose.

While one presently preferred topology has been described herein, other converter topologies, such as the half-bridge and full-bridge topologies, can be equally as well utilized. It is our intent, therefore, to be limited only by the scope of the appending claims and not by the specific embodiments or details described herein.

What is claimed is:

1. A power converter, comprising:

a power transformer having a split-primary winding with a tap connected between first and second primary winding ends, and a secondary winding flux coupled to the primary winding;

input means for receiving an input voltage;

output means for providing an output voltage;

a transinductor having a primary winding connected between said input means and said split-primary winding tap, and having a secondary winding flux-coupled to the transinductor primary winding;

first and second power switching means each for controllably causing a flow of current from an associated different one of said first and second primary winding ends;

unidirectional-conduction means coupled to both said transformer secondary winding and said transinductor secondary winding for rectifying flux-coupled energy to provide an output voltage $V_o$ to said output means; and means for operating said power switching means in a cyclic fashion, and for controlling only a duty-cycle of the power switching means to maintain the output voltage $V_o$ at a preselected level.

2. The converter of claim 1, wherein said operating means receives a feedback sample of said output voltage $V_o$ for controlling only said switching means duty-cycle to selectively operate in a Buck portion or a Boost portion of an input-to-output transfer characteristic to regulate said output voltage at said preselected level.

3. The converter of claim 1, wherein each of the transformer and transinductor has a substantially similar primary winding-to-secondary winding turns ratio N:1.

4. The converter of claim 1, further comprising: another output means; and another unidirectional-conduction means coupled to both said secondary windings for rectifying other flux-coupled energy to provide at said another output means another converter output voltage of substantially the same amplitude $V_o$ but of opposite polarity as the output voltage at said output means.

5. The converter of claim 4, wherein said transinductor has a pair of secondary windings; each of said unidirectional-conduction means and said another unidirectional-conduction means being coupled to a different one of said pair of secondary windings and connected to corresponding different ones of said output means and said another output means to provide oppositely-poled ones of said output voltage and said another output voltage.

6. The converter of claim 1, wherein the switching means are semiconductor switching devices.

7. The converter of claim 6, wherein the devices are MOSFETs.

8. The converter of claim 1, wherein each of the unidirectional-conducting means comprises at least one diode.

9. The converter of claim 8, wherein each diode is a semiconductive diode.

10. The converter of claim 1, wherein the switching means are a pair of switching devices operated in a push-pull mode.

11. The converter of claim 1, wherein the switching means are switched at a operating frequency greater than 1 KHz.

12. The converter of claim 11, wherein the switching means are switched at a operating frequency on the order of 500 KHz.

13. The converter of claim 1, wherein the output voltage is always less than a maximum input voltage.

14. The converter of claim 13, wherein the input voltage is variable over at least a 10:1 maximum-to-minimum range.

15. The converter of claim 1, wherein the input voltage is variable over at least a 10:1 maximum-to-minimum range.

16. The converter of claim 1, wherein the power transformer has a split-secondary winding, having a center tap connectable to a converter common potential.

\* \* \* \* \*